United States Patent [19]

Winter

[11] Patent Number: 5,042,750

[45] Date of Patent: Aug. 27, 1991

[54] AIRCRAFT ARRESTING SYSTEM

[75] Inventor: Ralph C. Winter, Doylestown, Pa.

[73] Assignee: Datron, Inc., Hoffman Estates, Ill.

[21] Appl. No.: 437,117

[22] Filed: Nov. 16, 1989

[51] Int. Cl.⁵ ............................................. B64C 25/68
[52] U.S. Cl. ............................. 244/110 C; 244/110 R; 244/110 F; 244/110 H; 114/145 R
[58] Field of Search ........... 244/110 A, 110 C, 110 F, 244/110 H, 110 R, 63; 114/145

[56] References Cited

U.S. PATENT DOCUMENTS

| | | | |
|---|---|---|---|
| 2,987,278 | 6/1961 | Hoffman et al. | 244/110 R |
| 3,138,355 | 6/1964 | Larson et al. | 244/110 C |
| 3,172,626 | 3/1965 | Haber et al. | 244/110 R |
| 3,317,164 | 5/1967 | Marcheron | 244/110 A |
| 3,350,039 | 10/1967 | Crater | 244/110 A |
| 3,414,333 | 12/1968 | Merle | 303/21 |
| 3,474,989 | 10/1969 | Strance | 244/110 A |
| 3,599,905 | 8/1971 | Strance | 244/110 A |
| 4,331,309 | 5/1982 | Myhr | 244/110 A |

FOREIGN PATENT DOCUMENTS 1532643  6/1968  France ............................ 244/110 C

OTHER PUBLICATIONS

Article, "Bringing Aviation to a Cool and Controlled Stop", David W. Moser and Andrew B. Walsh—B. F. Goodrich Aerospace and Defence, pp. 135, 140.

Primary Examiner—Joseph F. Peters, Jr.
Assistant Examiner—Christopher P. Ellis
Attorney, Agent, or Firm—William J. Spatz; Theodore F. Shiells

[57] ABSTRACT

An apparatus for controlling the rate of deceleration of a moving body. The apparatus has a cable or net for engaging a moving body and tape connected to the cable or net. The tape is wound onto a reel at the start of a deceleration and is unwindable from the reel during the deceleration so that unwinding the tape from the reel causes a corresponding rotation of the reel. A pump is operatively connected to the reel so that rotation of the reel causes pumping of a hydraulic fluid at a rate which increases as the rate of rotation of the reel increases. A control valve disposed across the discharge of the pump varies pressure drop across the control valve. A brake is provided for applying a braking force to the reel, and an actuator is provided for varying the braking force applied by the braking means in response to the pressure drop. A signal representative of the total linear length L that the tape has been unwound from the reel from the start of the deceleration to a particular time and the linear velocity V of the tape at that time are generated continuously or at frequent intervals during a deceleration. The actual flow rate FA through the control valve is also measured. A computer controls the actual flow rate FA through the control valve so that the value of FA divided by the value of V is approximately equal to a value R at the particular time during a deceleration, where R is a predetermined function of the linear length L the flexible means has been unwound.

10 Claims, 2 Drawing Sheets

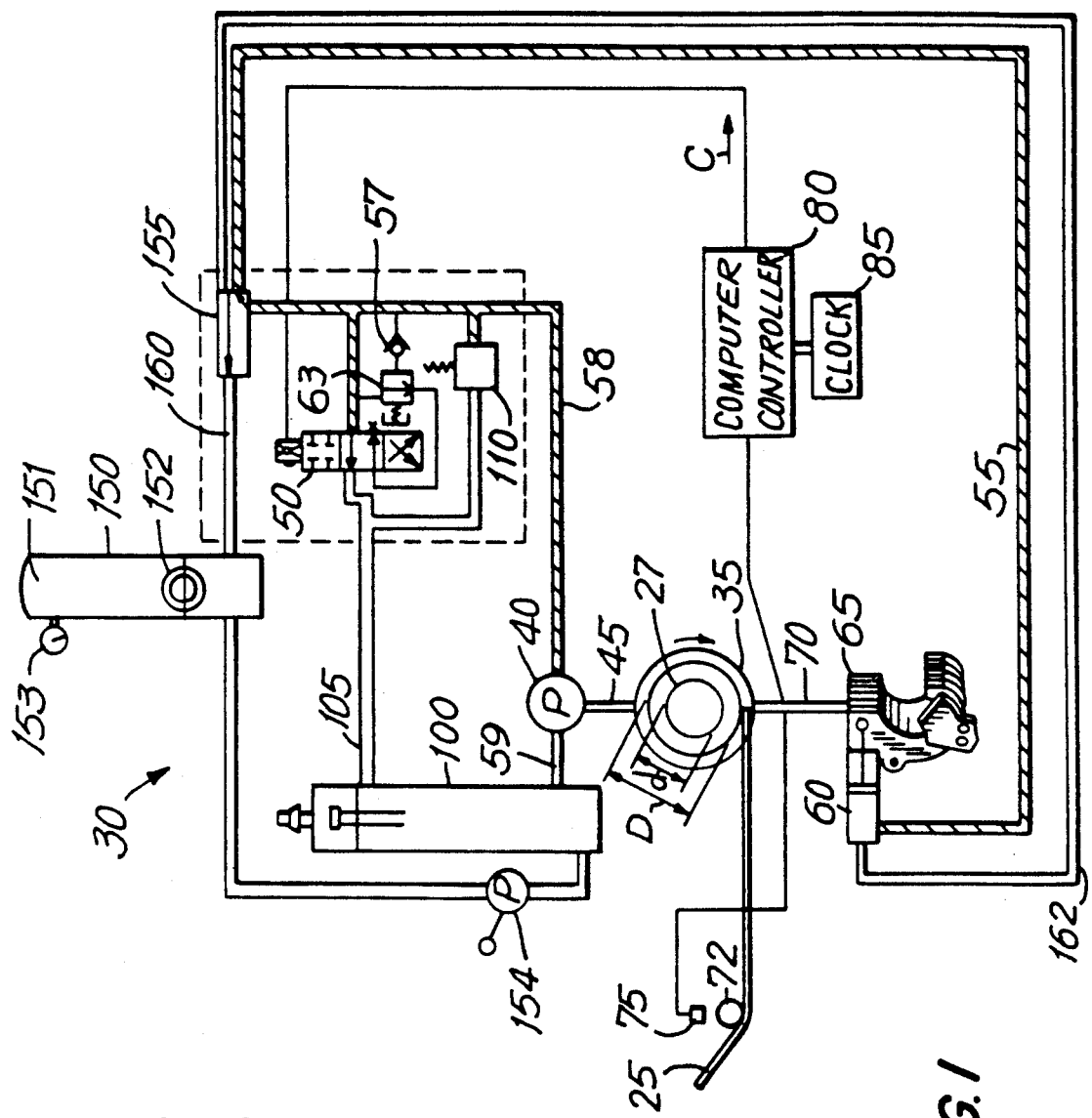
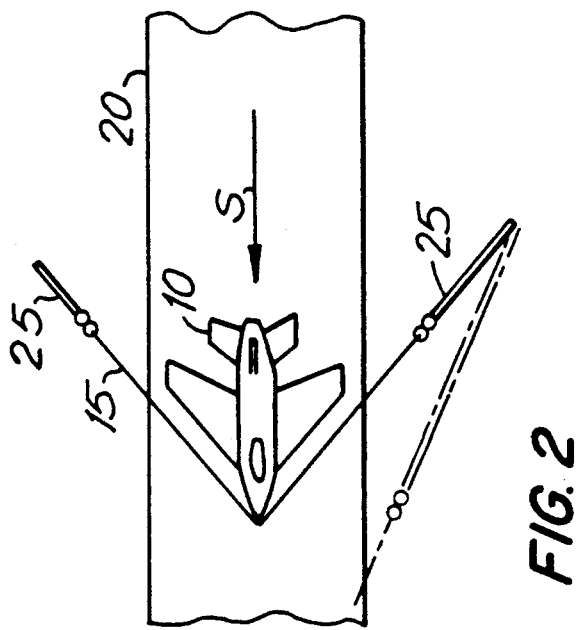
FIG.1
FIG.2

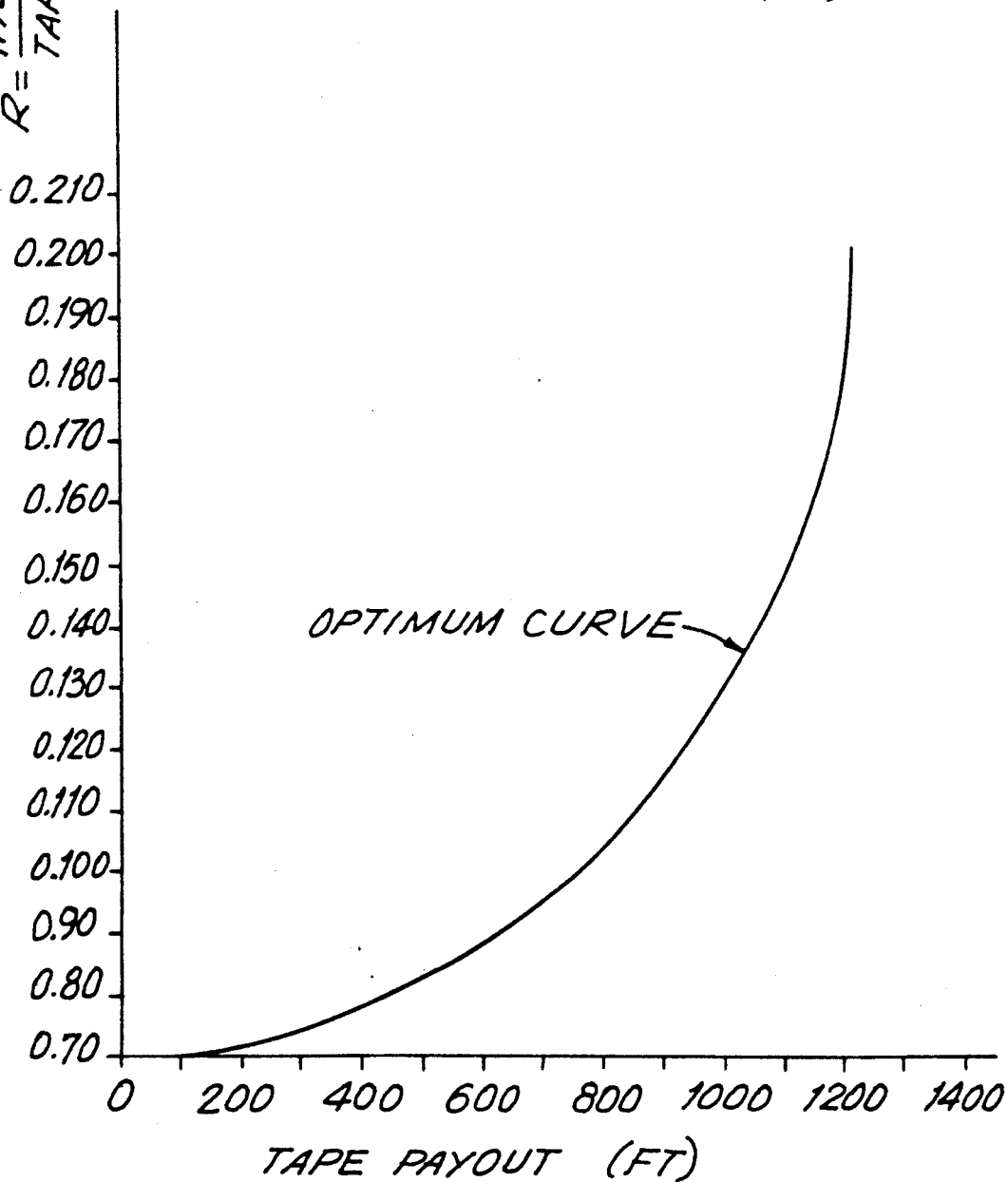

AIRCRAFT ARRESTING SYSTEM

FIELD OF THE INVENTION

The present invention relates generally to the field of aeronautics and, more particularly, to an automatic system for controlling the force applied by an aircraft arresting gear to a landing aircraft during arrestment.

BACKGROUND TO THE INVENTION

Aircraft arresting systems for arresting the forward motion of a landing aircraft in a limited amount of space, such as during an emergency landing or onto an aircraft carrier deck, are well known. These systems include a device for engaging the landing aircraft such as pendant cables or a net consisting of expandable fabric webbing straps stretched across the path of the incoming aircraft. The engaging device is connected at each of its ends to flexible means such as Nylon webbing or tape, each end of which is in turn, attached to an energy absorbing device called an arresting gear engine. The arresting gear engine is commonly either a friction brake or clutch, or a hydraulic damper.

Aircraft exist in a large range of sizes and weights, and the size and weight of the aircraft to be arrested will generally not be known in advance. Furthermore, the landing velocities of aircraft vary widely, and will likewise generally not be known until the instant of landing. It is imperative that the correct force be used to restrain each aircraft regardless of weight and velocity. If too great a force is applied, the hook (on hook-equipped aircraft) might be ripped off light aircraft. However, the same force may be insufficient to arrest heavy, high velocity aircraft in the available space. The same situation exists with net arrestments. Control of the force applied by the arresting system must be automatic, since the weight and velocity of the aircraft is not known in advance, and the entire period of the arrestment is generally only a few seconds.

Controlling the force applied to the aircraft to achieve the optimum deceleration has proven difficult in practice, particularly when there is a large range of aircraft weights and velocities to be arrested. This is due to, for example, the changes in the geometry of the pendant cable or net and webbing system which occur during the period of the arrestment, the fact that the diameter of the tape wound around the reel gradually decreases during the arrestment as more webbing is payed out, and the fact that lighter aircraft require less arresting force than heavier aircraft to achieve the same rate of deceleration. Further, the arresting force is generally affected by the speed of rotation of the tape reel, which speed changes during the arrestment. Because of all these simultaneous changes, and the fact that the aircraft must be brought to a complete stop in the range of a few seconds, prior art arresting gear systems have been designed for a relatively narrow range of aircraft weights and landing velocities.

OBJECTS OF THE INVENTION

It is an object of the present invention to provide an improved automatic control system for an arresting gear engine that will automatically adjust the arresting force applied to a landing aircraft throughout the period of the arrestment so as to bring the aircraft to a stop without damage to the aircraft, for a large range of aircraft weights and initial landing velocities.

A still further object of the present invention is to provide an automatic control system that is simple yet reliable in performance, relatively inexpensive to fabricate, and easily installed on new and existing arresting gear engines for both land runways and carrier decks.

SUMMARY OF THE INVENTION

In accordance with a preferred embodiment of the present invention, an apparatus for controlling the rate of deceleration of a moving body is provided comprising engaging means operatively engageable with said moving body and flexible means connected to the engaging means. The flexible means are wound onto a reel means at the start of a deceleration and are unwindable from the reel during the deceleration so that unwinding the flexible means from the reel causes a corresponding rotation of the reel. The apparatus further includes pumping means having an inlet and a discharge, the pumping means being operatively connected to the reel means so that rotation of the reel means causes pumping of a hydraulic fluid through the pumping means at a rate which increases as the rate of rotation of the reel increases. A control valve is operatively disposed across the discharge of the pumping means for varying pressure drop across the control valve. The apparatus further includes braking means for applying a braking force to the reel, and means responsive to the pressure drop across the control valve for varying the braking force applied by the braking means. The apparatus includes means for continuously or at frequent intervals during a deceleration generating a signal which is representative of the total linear length L that the flexible means has been unwound from the reel from the start of the deceleration to a particular time, means for continuously or at frequent intervals during a deceleration generating a signal which is representative of the linear velocity V at which the flexible means is being unwound from the reel at that particular time, means for continuously or at frequent intervals during a deceleration controlling the actual flow rate FA through the control valve so that the value of FA divided by the value of V is approximately equal to a value R at the particular time during a deceleration, where R is a predetermined function of the linear length L the flexible means has been unwound.

BRIEF DESCRIPTION OF THE DRAWINGS

These and other objects, features and advantages of the present invention will be apparent to those of ordinary skill in the art upon review of the following detailed description and drawings, wherein:

FIG. 1 is a schematic representation of an arresting gear apparatus including a control system in accordance with a preferred embodiment of the present invention;

FIG. 2 is a schematic representation of an aircraft engaging the engaging means of the present invention; and FIG. 3 is a graph of the optimum ratio R of hydraulic flow F through the control valve in feet per second divided by tape velocity V in feet per second plotted as a function of total tape lineal payout L in feet.

DETAILED DESCRIPTION

Referring now to the drawings in detail, and initially to FIG. 2 thereof, a landing aircraft 10 moving in direction S is depicted engaging a pendant cable and/or net 15 stretched across a runway 20. Flexible means, preferably webbing or tape 25, are connected to each end of the pendant cable and/or net 15. The opposite ends of each of the flexible means 25 leads to one of two arresting gear engines 30 (not shown in FIG. 2), preferably one on either side of the runway. Tape 25 is preferably Nylon or other sturdy woven fabric, approximately 8.5 inches wide by 0.225 inches thick and 800 to 1200 feet long. Prior to the arrestment, the tape and cable system is preferably pulled taut to be ready for an arrestment.

Referring now to FIG. 1, an arresting gear engine system 30 with its arresting force control system in accordance with a preferred embodiment of the present invention is depicted schematically. One end of tape 25 is wound around a hub 27 of a reel 35 connected to the arresting engine. Preferably, the tape is wound around the hub in overlying winds so that there is a maximum wound diameter D of the tape on the reel at the start of a deceleration and a minimum wound diameter d substantially smaller than the maximum wound diameter D at the end of the deceleration. When the landing aircraft 10 engages the pendant cable and/or net 15 depicted schematically in FIG. 1, the cable or net 15 pulls the two tapes 25 wound around their respective reels 35 to cause rotation of each of the reels. Only one reel 35 is shown in FIG. 1. A hydraulic pump 40 is mechanically linked to reel 35, by either direct or gear drive, shown schematically as shaft 45, so that rotation of reel 35 causes pumping of the hydraulic fluid at a rate which increases with higher speed of rotation of reel 35. The output of pump 40 leads through discharge line 58 to a control valve 50, which is conveniently a servo controlled hydraulic relay with the appropriate ports blocked. The control valve restricts the flow of fluid flowing back into the system reservoir 100 through return line 105, causing an increase in hydraulic pressure upstream of control valve 50 in line 55 dependent upon the actual flow rate FA and the degree of opening of control valve 50. A pressure reducing valve 63 and a check valve 57 are provided and connected to one of the bypass ports of the hydraulic relay to prevent build up of excessive pressure. The hydraulic back pressure in line 55 acts upon a hydraulic piston actuator 60 or similar device acting upon an arresting engine comprising a friction brake or clutch 65, schematically depicted as directly connected to reel 35 by shaft 70. A hydraulic damping arresting engine can also be employed instead of friction brake 65. As reel speed increases, more fluid is pumped through control valve 50, thus creating more back pressure in line 55 to act upon piston actuator 60 for the brake or clutch 65. The amount of back pressure applied to the brake or clutch at any given instant is controlled by changing the degree of opening of control valve 50.

The control system of the arresting apparatus of the present invention responds to the weight and velocity of the landing aircraft to signal the flow control valve 50 to move to the optimum setting for the aircraft arrestment. This system includes a sensing device 75 such as a magnetic pickup, Hall effect sensing switch or other such device, preferably located on a sheave 72 close to the tape exit from the arresting gear to monitor tape velocity V by means of the speed of rotation of sheave 72. Tape velocity V can also be determined from the velocity of rotation of reel 35, although in this case the tape velocity must be calculated from the formula Vtape = Vreel/f(diameter) where f(diameter) depends upon the instantaneous diameter of the tape wound onto the reel. However, since for a particular installation, the thickness of the tape, the hub diameter of the reel and the maximum diameter of the tape wound onto the reel will be known in advance, f(diameter) will be a function only of the total number of revolutions of reel 35. Thus, automatic calculation of tape velocity and payout using a suitably programmed microprocessor or electronic, hydraulic or mechanical analog computer 80 is straightforward. Preferably, time is recorded in the computer 80 by clock 85 from the moment the reel 35 or sheave 72 starts to rotate until the end of the arrestment. Tape velocity V in feet per second multiplied by time in seconds provides the computer with tape runout L in feet. Tape payout can also be measured directly or determined from the number of total revolutions of sheave 72 or reel 35.

Thus, from this measurement, both tape velocity V and tape lineal runout will be known at each measurement interval, whether determined directly, or calculated. These measurements are made continuously or at frequent intervals during the period of the arrestment.

The system also includes a pneumatic accumulator 150 for keeping an intermediate pressure in line 160 in preparation for an arrestment. The accumulator 150 includes a gas space 151, a sight gauge 152 and a pressure gauge 153. A manual pump 154 is provided to control the stand-by pressure.

The system also includes a shuttle valve 155 between pump discharge line 58 and line 55 to the brake actuator 60, and also connecting the accumulator line 160 to the line 162 leading from the pressurized side of the piston in the actuator 60. In its normal operation position, the shuttle valve 155 is in the depicted position, with line 162 connected to line 160 and line 55 connected to line 58. The purpose of shuttle valve 155 is to switch the lines after an arrestment, thus permitting the rewinding of the tape 25 in preparation for another arrestment.

Notwithstanding the generally complex and non-linear nature of the changing force requirements for the arresting engine due to changes in geometry of the cable/net and tape system during arrestment, different aircraft weights and velocities, etc., it has been discovered that there is a unique and simple relationship between the ratio R of the optimum flow rate F of hydraulic fluid through control valve 50 divided by tape lineal velocity V when plotted against total lineal tape runout L. For a large range of aircraft weights and landing velocities, including aircraft weights from 15,000 pounds to 100,000 pounds at velocities from 70 knots to 190 knots, this ratio R plotted against tape runout L falls within a narrow band. This relationship is graphically depicted in FIG. 3. This surprising relationship makes possible a simple and reliable control system for the arresting gear which will permit arrestment of a large range of aircraft weights and landing velocities.

Stored in the memory of computer 80 is a list of predetermined ratios R of optimum flow rate of hydraulic fluid F divided by tape velocity V which are unique functions of tape runout L. The ratio multiplied by the tape velocity V in feet per second, plotted against time, during the first two hundred feet of aircraft arrestment establishes the weight and velocity V in feet per second of the aircraft, which in turn provides the initial hydraulic flow required for the arrestment. The computer 80 then adjusts and readjusts the degree of opening of the control valve by control signal C to change the actual flow rate FA so that it is equal or nearly equal to the desired optimum flow rate F for the instantaneous value of tape velocity V and tape runout L at that particular time of measurement. The computer controls the valve position through valve electronics or other control means. The restriction of the flow FA by control valve 50 increases back pressure in line 55 that applies braking force to brake 65 thereby stopping aircraft 10.

Preferred optimum ratios R suitable for use in the present invention are graphically depicted in FIG. 3. As shown therein, the ratio R (equal to F/V) is a non-linear, but unique, function, of total tape payout L. The exact functional relationship depends upon the geometry of the particular installation, but will generally approximately be of the form $K+B(L^2)$ where K and B are predetermined constants for a particular installation and state of manual adjustment. However, K and B remain substantial constant during an arrestment and are independent of the weight and velocity of the aircraft to be arrested. Although FIG. 3 depicts F and V in terms of feet per second and L in feet, the relationship is independent of the units chosen to describe it.

Some tape slippage/stretch is experienced during the arrestment, most significantly at the beginning of the arrestment (referred to as the dynamic phase). This tape slippage/stretch will be filtered out electronically by the computer, using electronic simulation of the dynamic behavior of the particular tape preprogrammed into the computer software. In the hydraulic phase of the arrestment (the remaining period after dynamic phase, i.e. when the arrestment force is being controlled), the computer will also electronically compensate for slippage/stretch in the same manner.

An additional method of achieving the same goal would be to measure aircraft velocity directly (as by radar, for example) and tape runout as noted above. After determining aircraft velocity, the ratio R obtained from optimum hydraulic flow F in feet per second divided by aircraft velocity V in feet per second versus tape runout L will produce the optimum hydraulic flow F for the weight and velocity of the landing aircraft. The optimum ratio of hydraulic flow F divided by tape velocity V plotted against tape runout L likewise fall in a narrow band for a wide range of weight and velocity of aircraft.

The control system preferably includes a fail safe feature. In the event of a power failure or component failure, a spring-actuated normally closed solenoid valve 110 in parallel with the control valve 50 opens. Both valves 110 and 50 preferably have an orifice restrictor at an intermediate setting designed to accommodate aircraft most likely to be using that airfield. Furthermore, preferably control valve 50 defaults to an intermediate position in the event of computer or other failure.

Other embodiments and modifications within the scope of the present invention will readily be apparent to those of ordinary skill in the art having the benefit of the teachings presented in the foregoing description and graph.

I claim:

1. An apparatus for controlling the rate of deceleration of a moving body comprising:

engaging means operatively engageable with said moving body;

flexible means connected to said engaging means, said flexible means being wound onto a real means at the start of a deceleration and being unwindable from said reel during said deceleration so that unwinding said flexible means from said reel causes a corresponding rotation of said reel;

pumping means having an inlet and a discharge, said pumping means being operatively connected to said reel means so that rotation of said reel means causes pumping of a hydraulic fluid through said pumping means at a rate which increases as the rate of rotation of said reel increases;

control valve means operatively disposed across the discharge of said pumping means for varying pressure drop across said control valve;

braking means for applying a braking force to said reel;

means responsive to the pressure drop across said control valve for varying the braking force applied by said braking means;

means for, at frequent intervals during a deceleration, generating a signal which is representative of the total linear length L that said flexible means has been unwound from said reel from the start of said deceleration to a particular time;

means for, a frequent intervals during a deceleration, generating a signal which is representative of the linear velocity V at which said flexible means is being unwound from said reel at said particular time;

means for at frequent intervals during a deceleration, controlling actual flow rate FA through said control valve such that the value of FA divided by the value of V is approximately equal to the value of R at said particular time during a deceleration, where R is a numerical ratio the value of which varies with the linear length of the flexible means which has been unwound and providing a braking force which is optimal for the apparatus and the moving body engaged thereby.

2. The apparatus defined in claim 1, wherein said pumping means includes substantially positive displacement pumping means.

3. The apparatus defined in claim 2, wherein said positive displacement pumping means is a gear pump.

4. The apparatus defined in claim 3, wherein the mechanical inefficiencies in said positive displacement pumping means provide a small amount of backflow.

5. The apparatus defined in claim 1, wherein R is approximately equal to $K+B(L^2)$ where K and B are predetermined values which remain constant during a deceleration.

6. The apparatus defined in claim 1, wherein said means for controlling the flow rate through said control valve includes a microprocessor for electronically calculating the desired value of FA divided by V at a particular time and comparing it to the predetermined value of R for the linear length L of said flexible means which has been unwound at said particular time.

7. The apparatus defined in claim 1, wherein said braking means is a mechanical friction brake.

8. The apparatus defined in claim 1, further including means for defaulting said control valve to an intermediate failsafe position in the event of failure of said means for controlling the flow rate through said control valve.

9. The apparatus defined in claim 1 wherein the means for generating signals which are representative of parameters L, V and FA, generate such signals at infinitely small intervals such that the signals at infinitely small intervals such that the signals are continuous.

10. The apparatus defined in claim 9 wherein R is approximately equal to $K+B(L^2)$ where K and B are predetermined values which remain constant during a deceleration.

* * * * *